US007383234B2

(12) United States Patent
Iyer et al.

(10) Patent No.: US 7,383,234 B2
(45) Date of Patent: Jun. 3, 2008

(54) EXTENSIBLE DATA MINING FRAMEWORK

(75) Inventors: Raman S. Iyer, Redmond, WA (US); Ioan Bogdan Crivat, Redmond, WA (US); C. James MacLennan, Redmond, WA (US); Scott C. Oveson, Sammamish, WA (US); Rong J. Guan, Sammamish, WA (US); ZhaoHui Tang, Bellevue, WA (US); Pyungchul Kim, Sammamish, WA (US); Irina G. Gorbach, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/157,602

(22) Filed: Jun. 21, 2005

(65) Prior Publication Data

US 2006/0020620 A1   Jan. 26, 2006

Related U.S. Application Data

(60) Provisional application No. 60/586,586, filed on Jul. 9, 2004.

(51) Int. Cl.
    *G06N 5/00* (2006.01)
(52) U.S. Cl. .......................................... 706/12; 706/45
(58) Field of Classification Search ..................... 707/5; 714/47; 706/16, 12, 45
See application file for complete search history.

(56) References Cited

U.S. PATENT DOCUMENTS

| 5,970,482 | A | * | 10/1999 | Pham et al. | .................. 706/16 |
| 5,974,572 | A | * | 10/1999 | Weinberg et al. | ............. 714/47 |
| 6,006,223 | A | * | 12/1999 | Agrawal et al. | ............... 707/5 |

OTHER PUBLICATIONS

Draper, et al., XQuery 1.0 and XPath 2.0 Formal Semantics, W3C Working Draft, Apr. 4, 2005, pp. 1-300.*
Walmsley, Priscilla, Chapter 4, Navigating Input Documents Using Paths, XQuery, O'Reilly Media, Inc., 2007, pp. 39-56.*
OLE DB for Data Mining Specification Version 1.0. Microsoft Corporation, Jul. 2000. 133 pgs.

* cited by examiner

*Primary Examiner*—Wilbert L Starks, Jr.
(74) *Attorney, Agent, or Firm*—Amin, Turocy & Calvin, LLP

(57) ABSTRACT

The subject disclosure pertains to extensible data mining systems, means, and methodologies. For example, a data mining system is disclosed that supports plug-in or integration of non-native mining algorithms, perhaps provided by third parties, such that they function the same as built-in algorithms. Furthermore, non-native data mining viewers may also be seamlessly integrated into the system for displaying the results of one or more algorithms including those provided by third parties as well as those built-in. Still further yet, support is provided for extending data mining languages to include user-defined functions (UDFs).

19 Claims, 17 Drawing Sheets

EXTENSIBLE DATA MINING FRAMEWORK

CROSS-REFERENCE TO RELATED APPLICATIONS

This application claims the benefit of U.S. Provisional Application No. 60/586,586, filed Jul. 9, 2004 and entitled SYSTEMS AND METHODS OF CUSTOMIZING DATABASES. The entirety of this application is incorporated herein by reference.

BACKGROUND

Data mining or alternatively knowledge discovery relates to the process of exploring large quantities of data in order to discover meaningful information about the data that is generally in the form of relationships, patterns and rules. In this process, various forms of analysis can be employed to discern such patterns and rules in historical data for a given application or business scenario, and this information can then be stored as an abstract mathematical model of the historical data, referred to as a data-mining model (DMM). After the DMM is created, new data can be examined through or with respect to the model to determine if the data fits a desired pattern or rule. From this information, actions can be taken to improve results in many applications.

Various applications can benefit by employing data mining techniques. For instance, many organizations can be considered "data rich," since they are collecting increasing volumes of data for business processes and resources. Typically, these volumes or data mountains are used to provide "facts and figures" such as "there are X categories of occupation," or "this year's mortgage accounts in arrears" and so forth. However, merely having information at one's disposal does not necessarily represent knowledge but rather data to be further analyzed. Thus, it is patterns in the data that are more closely linked to knowledge than the actual data itself.

In many cases, data mining enables complex business processes to be understood and re-engineered. This can be achieved through the discovery of relationships or patterns in data relating to the past behavior of a business process. Such patterns can be utilized to improve the performance of a process by exploiting favorable and avoiding problematic patterns. Examples of business processes where data mining can be useful are customer response to mailing, lapsed insurance policies, energy consumption, sales prediction, product association, and risk assessment. In each of these examples, data mining can reveal what factors affect the outcome of the business event or process and the patterns relating the outcome to these factors. Such patterns increase understanding of these processes and therefore the ability to predict and affect the outcome.

In recent times, there has been some confusion among potential users of data mining as to which data mining technologies may apply. This confusion has been compounded by some technologies that claim to provide data mining tools when in reality the support is merely given to users to mine data manually for themselves. For instance, some vendors of query and reporting tools and OLAP (On-Line Analytical processing) tools promote that their products can be employed for data mining. While it is true that one can discover useful patterns in data using these tools, there is a question mark as to who or what is performing the discovery—the user or the tool. For example, query and reporting tools can interrogate data and report on any pattern (query) requested by the user. This is a manual and validation driven process of discovery in the sense that unless the user suspects a pattern they may never be able to determine it. A marginally better situation is encountered with the OLAP tools, which can be termed "visualization driven" since they assist the user in the process of pattern discovery by displaying multi-dimensional data graphically. The class of tools that can genuinely be termed "data mining tools" however are those that support automatic discovery of relationships and/or patterns in data.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the description that follows concerns an extensible data mining system or framework and associated methods. More particularly, non-native data mining algorithms and viewers can be plugged in or integrated into a data mining system including but not limited to a data-mining server and one or more client tools. Furthermore, a data mining language can be extended to support user-defined functions (UDFs).

Data mining systems typically provide some standard out of box data mining algorithms. However, it is desirous as well as advantageous to support additional algorithms that implement alternative techniques and/or are targeted for a particular business or problem space. Accordingly, a system is presented for receiving non-native or plug-in mining algorithms, for example supplied by third parties such as niche vendors, among others. Furthermore, these algorithms can be integrated within the system at the same level as built-in algorithms supplied as part of a product and can thus take advantage of a plurality of system services or facilities. This frees developers from having to implement data handling, parsing, metadata management, session and row set production code, among other things, on top of the core data mining algorithm implementation. To support such tight integration a data-mining algorithm can include or implement one or more interfaces that can be utilized or consumed by a data-mining system. Additionally, the data-mining system can include one or more interfaces that can be employed or consumed by the mining algorithm.

In addition to standard mining algorithms, data mining systems often include standard built-in viewers associated with the one or more of the built-in algorithms. The disclosed system is extensible in that it can receive and employ non-native viewers, for instance developed by third parties. By way of example, others may develop more advanced or user-friendly viewers from which they wish data-mining data to be displayed. Accordingly, support is provided for receiving or plugging in non-native viewers. Such viewers can be employed to display data-mining model context associated with built-in mining algorithms and/or non-native algorithms.

Furthermore, a database mining language such as DMX (Data Mining Extensions for SQL) can be extended to support user-defined functions. Data mining languages can include a plurality of built-in functions that a data mining system supports. However, there are many situations in which the functionality that a user needs is not provided by the built-in functions. Accordingly, support is provided for UDFs (User Defined Functions). Extending a data mining language to support UDFs, among other things allows users to perform their customized functionality within the same language framework, thereby maximizing reusability and performance of the UDFs.

To the accomplishment of the foregoing and related ends, certain illustrative aspects of the invention are described herein in connection with the following description and the annexed drawings. These aspects are indicative of various ways in which the invention may be practiced, all of which are intended to be within the scope of invention. Other advantages and novel features may become apparent from the following detailed description when considered in conjunction with the drawings.

DETAILED DESCRIPTION

The various aspects of the claimed subject matter are now described with reference to the annexed drawings, wherein like numerals refer to like or corresponding elements throughout. It should be understood, however, that the drawings and detailed description relating thereto are not intended to limit the invention to the particular form disclosed. Rather, the intention is to cover all modifications, equivalents, and alternatives falling within the spirit and scope of the claimed subject matter.

As used herein, the terms "component," "system," "engine" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 1:
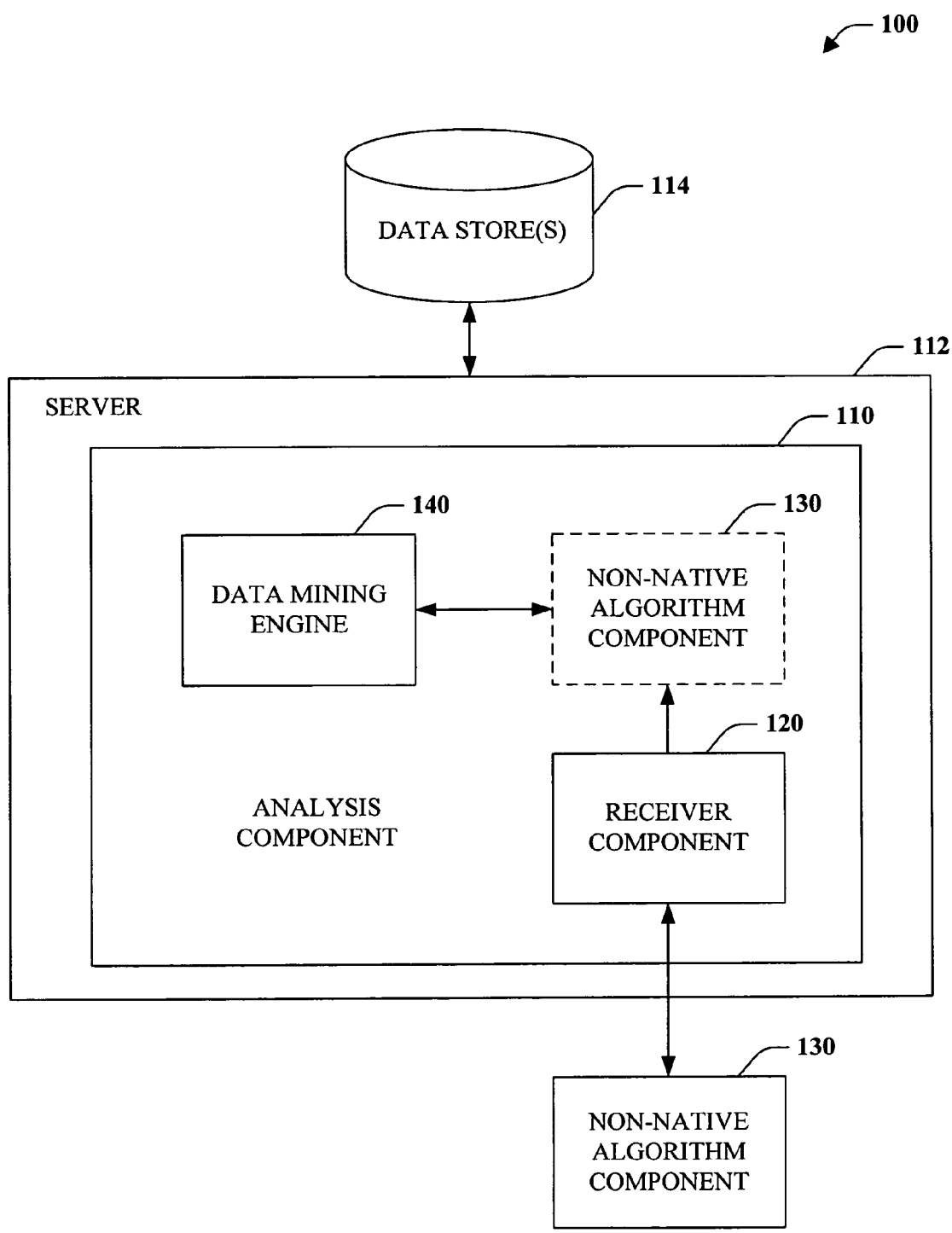
FIG. 1 is a block diagram of an extensible data mining system that receives non-native algorithms.

Turning initially to FIG. 1, an extensible data mining system 100 is depicted. System 100 provides a platform or framework to support, among other things, plug-in of non-native mining algorithms. System 100 includes an analysis component 110 that provides services or mechanisms for analyzing data. Analysis component 110 can be included as part of a larger system 112 such as a server, for example, a data mining server, analysis server, a database server or database management system 112 comprising hardware, software or a combination thereof that manages and facilitates interaction with data stored on one or more data stores 114 (e.g., relational, multidimensional, object-oriented, hybrid . . . ).

Analysis component 110 includes a data-mining engine 140. Data mining engine 140 includes components, mechanisms, systems and/or services to enable mining of data. For example, mining engine 140 can employ a data-mining algorithm to discover rules and/or patterns with respect to a first set of data. Mining engine 140 can subsequently generate a data-mining model (DMM) that can be utilized to analyze a second set of data. For instance, predictions can be made or data classified, inter alia. Data mining engine 140 may include or otherwise be communicatively coupled to one or more native or built-in mining algorithms such as those implementing decision trees, naïve Bayesian, clustering, association rules, neural network, time series, or support vector machines. However, such algorithms may be suitable for general employment rather than specific to a particular problem. Alternatively, the built-in algorithms may not employ a particular data mining technique or analysis algorithm. Consequently, it may be desirous to enable the data mining engine to employ other algorithms perhaps developed by research or industry (e.g., niche vendors). Accordingly, analysis component 110 can also include a receiver component 120.

Receiver component 120 receives, retrieves or otherwise obtains a non-native algorithm component 130. Non-native algorithm component 130 corresponds to an electronic version or representation of a data-mining algorithm that was not initially built in or provided by a system. Hence, the algorithm component 130 can be developed, for example, by researchers, academics, or other third parties like niche vendors for particular problem spaces. Such an algorithm can be introduced or plugged to the system or server 112 and analysis component 110 from a client via receiver component 120. Furthermore, receiver component 120 can facilitate saving and registering the algorithm such that it can be employed by data mining engine 140 to generate a data mining model, among other things. The algorithm can be saved to data store 114 and registered in a registry also stored on data store 114.

Once plugged in the non-native algorithm component 130 can be employed just as if it were a native or built-in algorithm. Accordingly, the algorithm component can employ one or more server or database management services or mechanisms, which frees algorithm developers from having to implement them. For example, for training of a data mining model states, numbers, or other data can be formatted in a manner to facilitate comprehension or understanding by the algorithm for instance by tokenizing the data. In addition, support can be provided for querying or utilizing a mining model, for instance by a parser. Further, infrastructure is supplied for storing and managing access to a data-mining model or object. In particular, support can be provided to limit or secure access, supply concurrent access to a model by a plurality of users, manage transactions, and back up and restore, among other things. Moreover, the tight integration of non-native algorithm component(s) 130 enables them to take advantage of future additions to a system such as server 112 or management services associated therewith.

Figure 2:
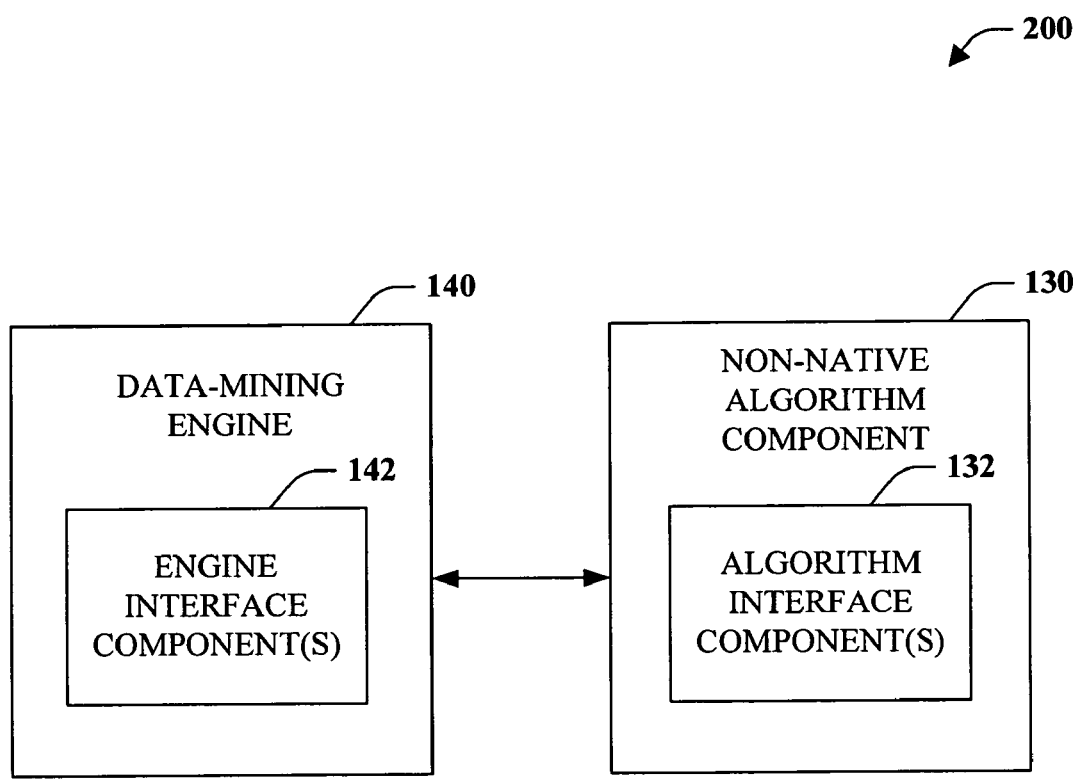
FIG. 2 is a block diagram of an interface system that facilitates employment of plug-in algorithm components.

FIG. 2 illustrates an interface system 200 that facilitates employment of non-native or plug-in algorithm components. System 200 includes a data-mining engine 140 and an algorithm component 130. Data mining engine 140 can include one or more engine interface components 142 and algorithm component 130 can include one or more algorithm interface components 132. Such interface components 142 and 132 can correspond to application program interfaces, for example. Engine interface component(s) 142 enable the mining algorithm component 130 to interact with the data-mining engine 140 and/or services provided thereby. In other words, engine interface components 142 are consumed by algorithm component 130. Algorithm interface component(s) 132 enable the data-mining engine 140 to interact with the mining algorithm component 130. Stated differently, algorithm interface component(s) 132 are implemented by the algorithm component 130 and consumed by the data-mining engine 140.

By way of example and not limitation, engine interface components 142 can include IDMPushCaseSet, IDMAttributeset, IDMAttributeGroup, IDMPersistenceWriter, IDMServices, IDMContextServices, IDMModelServices, IDMMemoryAllocator, IDMStringHandler, and IDMVariantPtrHandler. IDMPushCaseSet can be employed to pass case processing information from the data-mining engine 140 and an algorithm instance. The IDMAttributeset encapsulates information about the attributes contained by input cases. Attributes can be grouped together based on certain criteria including but not limited to related attributes or nested tables. IDMAttributeGroup provides a mechanism to iterate over such groups of attributes. IDMPersistenceWriter is an abstract interface for a stream to which algorithms can save their content. The stream is implemented by an analysis component or server over its own storage system for the algorithm's parent mining model, and passed to the algorithm via an IDMPersist::Load method. IDMServices is a base interface for passing shared information from the data-mining engine 140 to the algorithm component 130. This interface exposes services like memory allocators, string and variant handling, persistence to files, and transactions. IDMContextServices is a context interface that can be passed to most algorithm component calls. It derives from IDMServices interface described infra and provides access to locale, memory allocators, and other information specific to the current request. IDMModelServices is the context interface that will be passed when an algorithm instance is created. It can be used to access model-specific information as well as allocators whose lifetime is tied to a data mining object. IDMMemoryAllocator allows a plug-in algorithm component 130 to allocate and free memory in a server memory space. IDMStringHandler provides access to an internal string data type. Pointers to strings that are passed to algorithm methods will be treated as opaque handles that can be decoded by IDMStringHandler methods. Finally, IDMVariantPtrHandler is an interface that provides access to an internal variant data type. Pointers to variants that are passed to algorithm methods can be treated as opaque handles that can be decoded by IDMVarientHandler methods.

Algorithm interface component(s) 132 consumed by data-mining engine 140 can include but are not limited to IDMAlgorithmFactory, IDMAlgorithmMetedata, IDMAlgorithm, IDMCaseProcessor, IDMAlgorithmNavigation: IDMDAGNavigation, IDMPullCaseSet, IDMPersist, IDMCaseIDIterator, IDMMarginalStat, IDMClusteringAlgorithm, IDMSequenceAlgorithm, IDMTimeSeriesAlgorithm, IDMDispatch, and IDMTableResult. IDMAlgorithmFactory is the entry point into a plug-in algorithm provider 130. This interface can be requested upon instantiating an algorithm component or provider 130, and employs it to create a new algorithm instance that will be bound to corresponding mining models in the server space. IDMAlgorithmFactory can also be queried for the IDMAlgorithmMetadata interface. IDMAlgorithmMetadata interface is employ by the data-mining engine to interrogate an algorithm component's capabilities. This includes attribute set validation. IDMAlgorithm is the core algorithm interface that provides access to various functions of an algorithm instance including training, prediction and browsing. IDMCaseProcessor supplies formatted cases to the algorithm component 130 for training. IDMAlgorithmNavigation: IDMAGNavigation exposes a trained model's algorithm content to the data-mining engine 140 for browsing. IDMPullCaseSet is an interface that will be consumed by the analysis component for sample case generation. The data-mining engine 140 invokes IDMPersist for loading and saving algorithm-specific content into a stream provided by the server. IDMCaseIDIterator may be implemented by an algorithm component or provider 130 for filtering and controlling case generation. Marginal statistics may be required during prediction query processing. They may be gathered either by the engine during case generation or by the algorithm component 130 itself during training. If the algorithm component 130 indicates (e.g., through a method in the IDMAlgorithmMetadata interface) that statistics will be gathered and exposed by the algorithm component 130, the component should provide the interface IDMMarginalStat. Otherwise, the data-mining engine 140 will initialize the algorithm with its own implementation of this interface. Clustering algorithms can optionally support IDMClusteringAlgorithm interface so that a data mining engine 140 query processor can successfully return results for queries that invoke algorithm-specific functions, such as Cluster( ). Sequence clustering algorithms can optional support the IDMSequenceAlgorithm interface so that a query processor can successfully return queries that invoke algorithm-specific functions, such as Sequence( ). Sequence clustering algorithms can also support the IDMTimeSeriesAlgorithm interface so that a query processor can successfully return results for queries that invoke algorithm-specific functions, such as Time( ). Algorithm component 130 can also support custom functions, in which case they can implement IDMDispatch interface on the algorithm object to allow invocation of those functions. Finally, algorithm component 130 can support table-returning custom functions the interface IDMTableResult expose those results.

Figure 3:
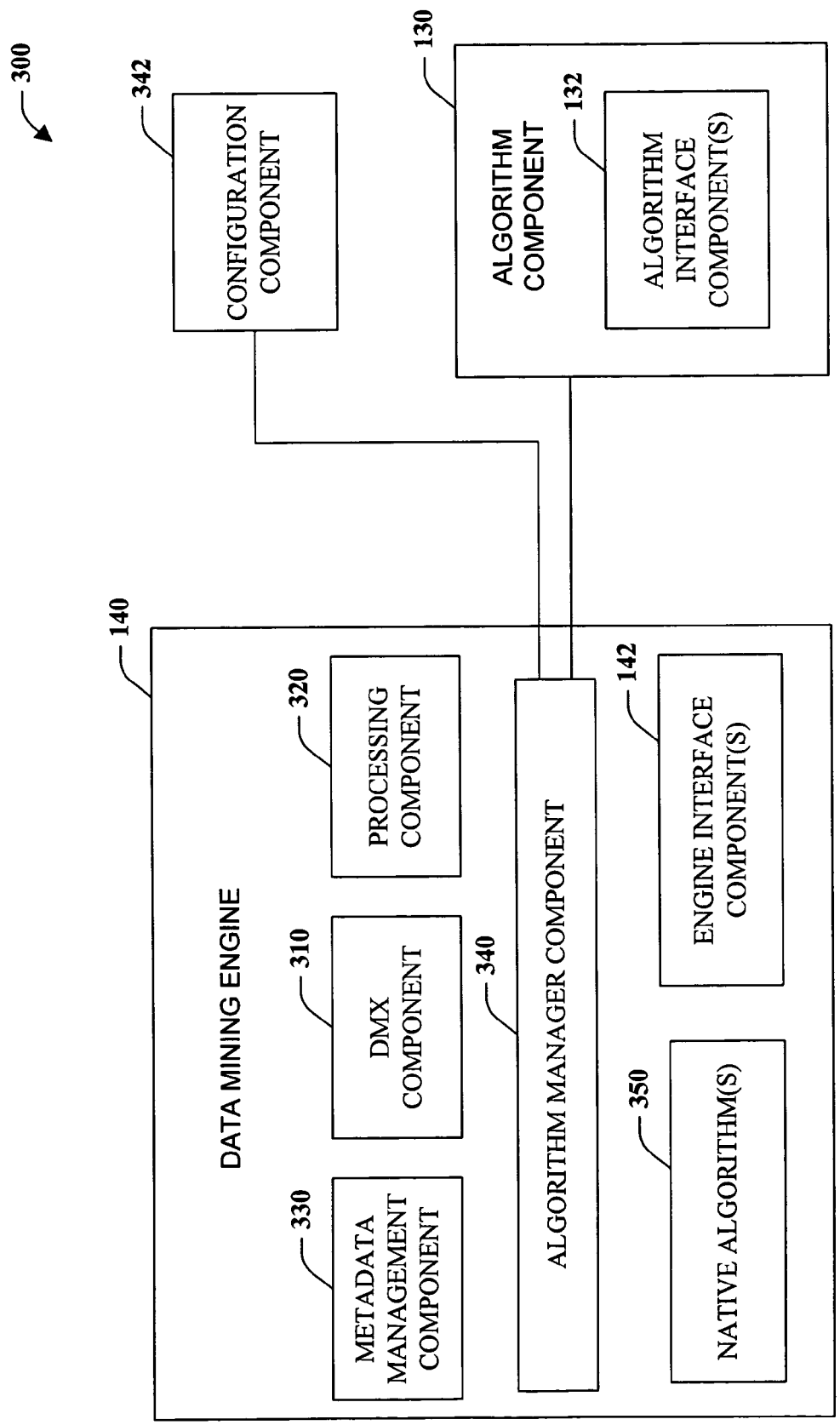
FIG. 3 is a block diagram of a non-native algorithm plug-in system.

Turning to FIG. 3, a non-native algorithm plug-in system 300 is depicted. System 300 comprises a data mining engine 140, a configuration component 342 and non-native, third-party, or plug-in algorithm component 130 including interface component(s) 132. Data mining engine 140 includes a myriad of components including a DMX (Data Mining Extensions) component 310, processing component 320, metadata management component 330, algorithm manager component 340, native algorithms 350, and engine interface component(s) 140 all of which may interact with one another. DMX component 310 provides extensions to SQL (Structured Query Language) to support data mining querying and processing. Processing component 320 processes requests or queries with respect to algorithms such as native algorithm component(s) 350 and/or non-native algorithm component(s) 130. Processing can be accomplished with the assistance of interfaces such as engine interface component(s) 142 and algorithm interface component(s) 132, among other things. Such requests can be specified in DMX or another data mining language and thus processing component 320 can employ DMX component 310 to facilitate parsing and ultimately execution or evaluation of requests. Metadata management component 330 can manage metadata or information about data that pertains to data mining. Algorithm manager component 340 can manage both native and non-native algorithm components 350 and 130, respectively. In particular, algorithm manager component 340 can initialized both native and non-native algorithm components 350 and 130 as well as load and create a new instance of non-native or plug-in algorithm component 350, among other things. Configuration component 342 can receive a request to initialize configuration of data mining engine 140 or a server associated therewith. Upon receipt of such a request, server configuration information can be loaded and algorithm configuration initiated through algorithm management component 340. The management component 340 can then utilize one or more algorithm interface component(s) 132 to load a non-native algorithm component 130 and create a new instance of the algorithm, inter alia.

Figure 4:
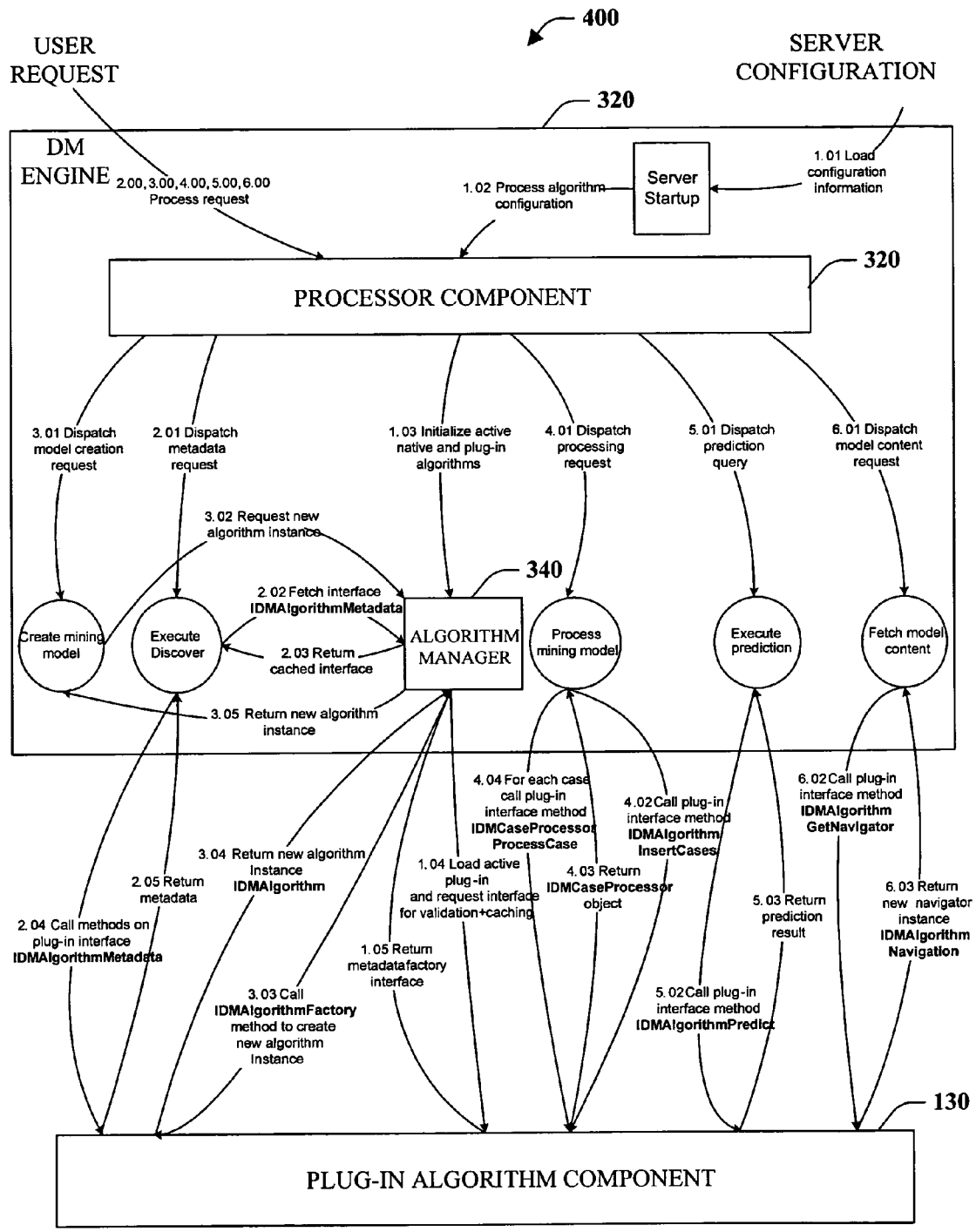
FIG. 4 is a block diagram of a data mining plug-in algorithm data flow.

FIG. 4 illustrates a data-mining non-native or plug-in algorithm component data flow 400. The data flow 400 aids in understanding how exemplary interfaces can be utilized or employed to support a plug-in algorithm. Data flow system 400 includes a data-mining engine 320 and a plug-in algorithm component 130. Data mining engine 320 includes processing component 320 as well as algorithm manger component 340. Processing component 320 can process requests from users or applications and also algorithm configuration. As described supra, server configuration information can be loaded and the server associated with the data-mining engine 140 can be started up or restarted. Subsequently, processor component 320 can process configuration algorithm configuration with the assistance of algorithm manager component 340, which loads an active plug-in and requests an interface for validation and caching. A metadatafactory interface is returned. If the request is to request or discover metadata then algorithm interface IDAlgorithmMetadata can be called, which returns the metadata. If the request concerns creation of a mining model, then a new algorithm instance can be requested from the algorithm manager component 340. The algorithm manager component 340 then calls IDMAlgorithmFactory method to create a new algorithm interface and a new instance IDMAlgorithm is returned to the algorithm manager component 340. If the request is to process or train a data-mining model, a call can be made to algorithm interface method IDMAlgorithmInsertCases that will return an IDMCaseProcessor object. For each case, the algorithm interface IDMCaseProcessorProcess case is called. For predictions, algorithm interface method IDMAlgorithmPredict can be called which will return a prediction result. If the request is for model content, the algorithm interface method IDMAlgorithmGetNavigator can be called which returns a new navigator instance IDMAlgorithmNavigation.

Figure 5:
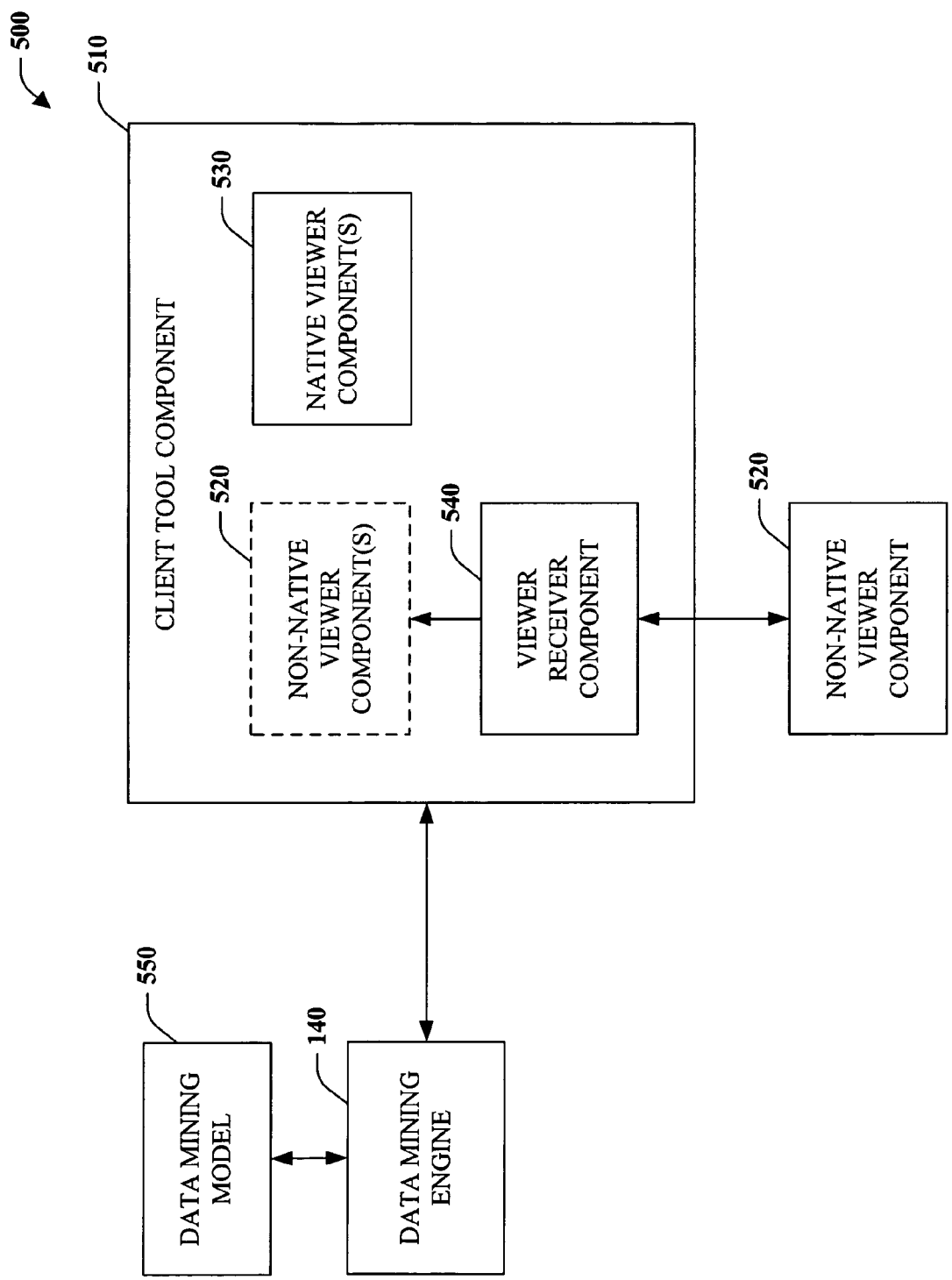
FIG. 5 is a block diagram of an extensible data mining system that receives non-native viewers.

FIG. 5 is a block diagram of an extensible data mining system 500 to support additional view components. System 500 includes a data-mining engine 140 and a client tool component 510. Data-mining engine 140 can employ a data-mining algorithm that analyzes stored data and produces a data-mining model 550 identifying rules and/or patterns in data. The data-mining engine 140 can subsequently utilize this model 550 to predict and/or classify, among other things, newly received data. Often, users desire to view the generated model 550. The learned model content can be displayed by viewers or graphical user interfaces (GUIs) that are customized for a mining algorithm employed to generate a data-mining model.

Client tool component 510 is a mechanism to facilitate interaction with data mining data and/or information. For example, client tool component 510 could be a design, development, and/or workbench environment or system. Client tool component 510 can include one or more native viewer components 530, for example provided by the client tool vendor. Such viewers can be employed to view mining model content generated by particular data mining algorithms. Client tool component 510 can also include a viewer receiver component 540 that can receive, retrieve or otherwise obtain one or more non-native viewer components 520, for instance provided by clients, users, or third party vendors. The receiver component 540 can then save the non-native viewer component 510 to facilitate future employment. Furthermore, the receiver component 540 may register the viewer component 520 with the client tool component and/or the data-mining engine 140 to identify its presence and availability. For example, the receiver component 540 may register the name and location of the viewer component assembly as well as the compatible data mining algorithms and a display name.

The data-mining engine 140 can interact with client tool component 510 such that a non-native viewer component 520 or an instance thereof can be invoked. For instance, the data-mining engine 140 can transmit information to the client tool component 510 pertaining to the algorithm utilized to generate a model sought to be viewed or displayed. Where a data mining algorithm has more than one viewer capable of displaying a model, the names of the available viewer components can be presented to a user, for instance in a drop down list, for selection, for example in a data mining wizard provided by the client tool component 510. It should be appreciated that the non-native viewer component 520 that is plugged in to the client tool component 510 can display models associated with built-in or non-native plug-in data mining algorithms. For example, a custom viewer could be designed and plugged in to the client tool component 510 to display a model generated by a built-in or native data-mining algorithm in a different or more enhanced manner. Additionally or alternatively, a non-native viewer component 510 could be added or plugged-in to support display of a model generated by a non-native data-mining algorithm that was added or plugged in to the data-mining engine 140 or newly associated therewith.

Figure 6:
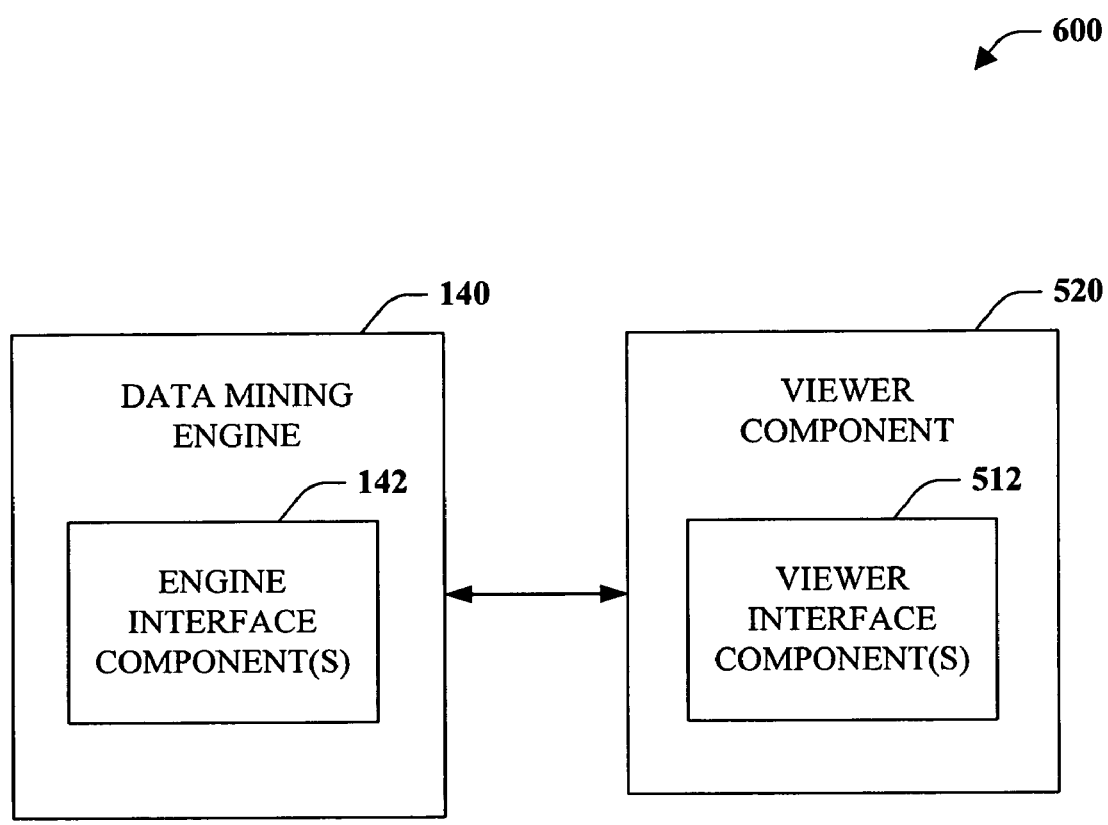
FIG. 6 is a block diagram of an interface system that facilitates employment of plug-in viewer components.

FIG. 6 depicts an interface system 600 that facilitates employment of a non-native or plug-in viewer. System 600 includes a data-mining engine 140 and a viewer component 520. Data mining engine 140 may include one or more engine interface components 140 that can be utilized or consumed by viewer component 520. Similarly, viewer component 520 may include one or more viewer interface components 512 that may be utilized or consumed by data mining engine 140 to support interaction and ultimately display via viewer component 520. By way of example and not limitation, the viewer component 520 may be required to include or implement an interface 512 such as IMiningModelViewerControl to be a pluggable viewer component 520. Other interfaces 512 could be Display Name for displaying the name of the viewer, Service Provider and Connection String to facilitate connection to the mining engine view a specified string, Model Name to return the name models supported, as well as LoadViewerData. The LoadViewerData interface method can be called when the viewer component is asked to render a model. In such an interface, a method is provided that connects to the server, loads the content of the model and renders the content. Various other interfaces 512 may be required or optional.

Figure 7:
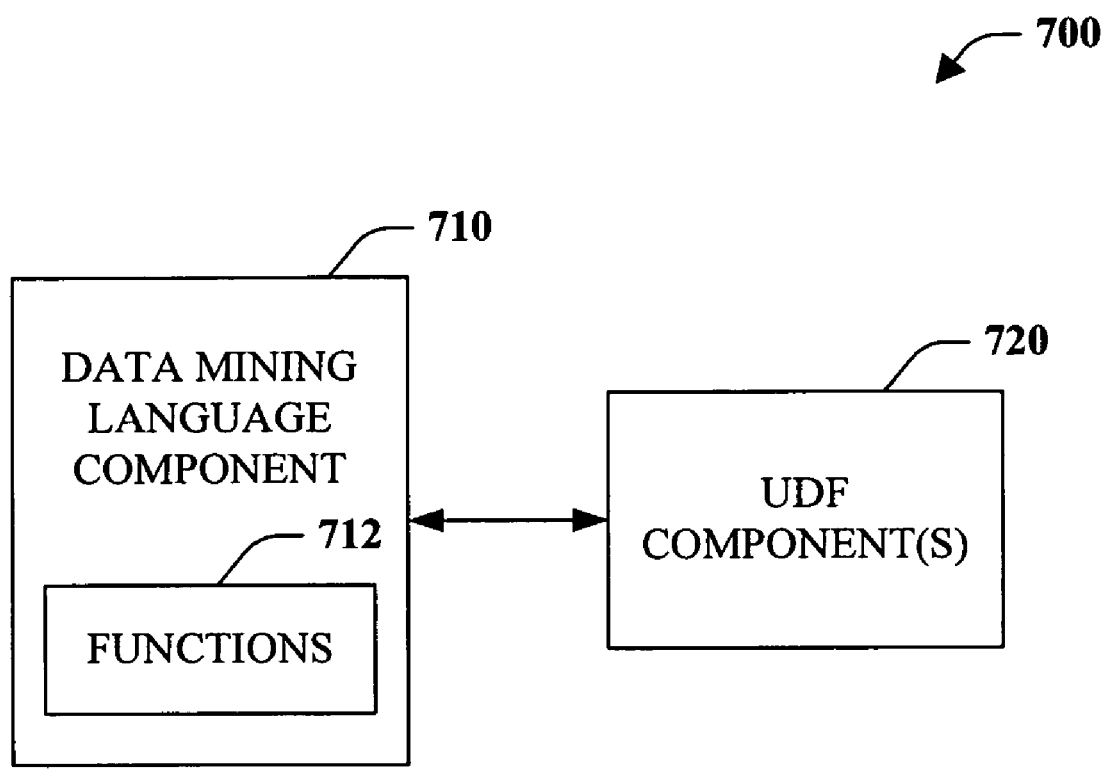
FIG. 7 is a block diagram of a system that extends a data mining language.

FIG. 7 illustrates a system 700 for extending a data mining language. System 700 includes a data mining language component 710 and a user-defined function (UDF) component 720. A data mining language component 710 provides a mechanism for expressing, specifying and executing data mining as well as other operations. Data mining language component 710 can include one or more commands for manipulating a mining object such as a data-mining model (DMM). For example, a "Create" statement can be employed to create or generate a DMM, object, or instance thereof, "Insert Into" can be utilized to populate or train a DMM with data, and a "Select" statement can be specified by a client to make predictions and otherwise explore the DMM. Data mining language component 710 can also include built-in functions 712 such as Predict( ), PredictProbability( ), PredictHistogram( ), ClusterProbability( ), and the like. User-defined functions are similar to built-in functions in a data mining language, except they are generated by users. A UDF can provide some logic or function and is defined by the name of the function, the return type of the function, and a list of parameters and the parameter types. The data mining language component can be extended by supporting user-defined functions or procedures. Among other things, this will enable data mining statements, expressions, commands and the like to include, reference, and/or utilize both native functions as well as one or more UDF components 720. As data mining applications become more complicated, supporting UDFs in a data mining language will become a core requirement in many data mining practices. Without this technology, users would have to write separate code in their applications, which is not easily re-usable. Extending an existing data mining language to support a UDF allows users to perform their customized functionality within the same language framework, thereby maximizing the reusability and the performance of the UDF.

As illustrated, data mining language component 710 is communicatively coupled to one or more UDF components 720. When a UDF component 720 is invoked by data mining language component 710, context information can be passed to the UDF component 720. Context includes anything that the data mining language component 710 uses to evaluate a data mining function for the particular model and prediction input. Examples of context include but are not limited to information regarding the database or data mining model being used, prediction input cases, and other server context such as session, memory allocators, collation, and the like. The UDF component 720 can receive context, for instance, through a predefined variable, a parameter, or thread local storage.

Parameters of a UDF component 720 can be any expression including a column reference that binds to either the data-mining mode being utilized or the prediction input. Further, an object model can be provided to the UDF component 720 to enable the component to access the mining model, column and prediction input from the column references.

Figure 8:
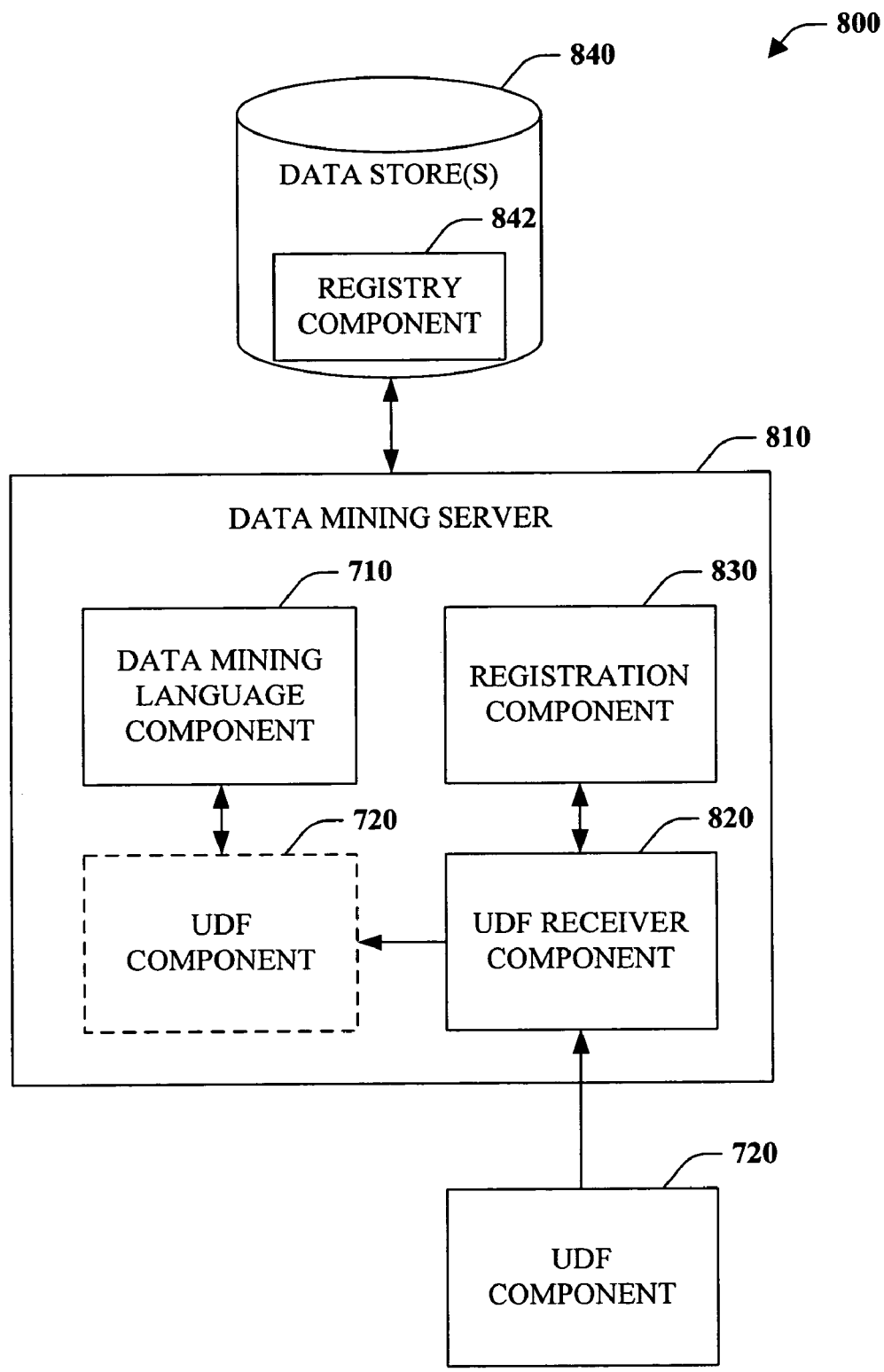
FIG. 8 is a block diagram of an extensible data mining system.

Turning to FIG. 8, an extensible data mining system 800 is depicted. System 800 extends a data mining language to support user-defined functions or procedures. System 800 includes a data mining server 810 that, inter alia, provides a mechanism, components, systems and/or services that enable mining of data for example to discern patterns and/or rules. Server 810 can be a component as that term is defined herein. Accordingly, server 810 can comprise hardware, software, or a combination thereof. Server 810 includes a data mining language component 710 that provides a mechanism for expressing, specifying and executing data mining operations. For example, data mining language component 710 can facilitate specification and execution of one or more commands for manipulating a mining object such as a data-mining model (DMM). Furthermore, mining language component 710 can include one or more built-in or native functions. Data mining server 810 also includes a UDF receiver component 820. Receiver component 820 receives, retrieves or otherwise obtains one or more UDF components 720.

A UDF provides user defined or customized logic or functionality. Similar to any built in function in a data mining language, a UDF can be defined at least by the name of the function, the return types of the function and a list of parameters and their types. The implementation of a UDF can be accomplished in various programming languages including but not limited to Visual Basic, C/C++, C#, and Java. The following is an exemplary UDF written in C#:

```
using System;
namespace UDFSample
{
        public class UDFSampleClass
        {
                public UDFSampleClass ( )
                {
                }
                public string GetTypeString(int in_Type)
                {
                        if (in_Type == 0) return "Good";
                        else return "Bad";
                }
        }
}
```

Once a UDF is programmed and compiled into an assembly or library (e.g., DLL file), it can be provided to a data mining server 810 and more particular to UDF receiver component 820. UDF receiver component 820 receives the UDF component and stores a copy thereof to a non-volatile data store 840.

Registration component 820 can retrieve or discern UDF metadata and register the component in a registry component 842 located on a non-volatile data store 840. Once the UDF component 720 is registered, the data mining language component 710 can recognized the new function. It should be appreciated that registration, or the process thereof, can be dependent upon the interface that the data-mining server 810 exposes. The following is an example of XMLA (Extensible Markup Language for Analysis) that registers a new UDF to a data mining server 810:

```
<?xml version="1.0" encoding="UTF-8"?><Batch
xmlns="http://schemas.microsoft.com/analysisservices/2003/engine">
    <Create AllowOverwrite="true">
    <ParentObject>
        <DatabaseID>DMXTest</DatabaseID>
    </ParentObject>
    <ObjectDefinition>
        <Assembly xsi:type="ClrAssembly"
xmlns:xsi="http://www.w3.org/2001/XMLSchema-instance">
            <ID>DMSProc</ID>
            <Name>DMSProc</Name>
            <PermissionSet>Unrestricted</PermissionSet>
            <ImpersonationMode>ImpersonateCurrentUser</ImpersonationMode>
            <Files>
                <File>
                    <Name>DMSProc.dll</Name>
                    <Type>Main</Type>
                    <Data>
                        <Block>TvqAAAA...</Block>
                    </Data>
                </File>
            </Files>
```

-continued

```
        </Assembly>
    </ObjectDefinition>
    </Create>
</Batch>
```

Once the new UDF is registered, it can be used in the data mining language, for example for prediction.

Figure 9:
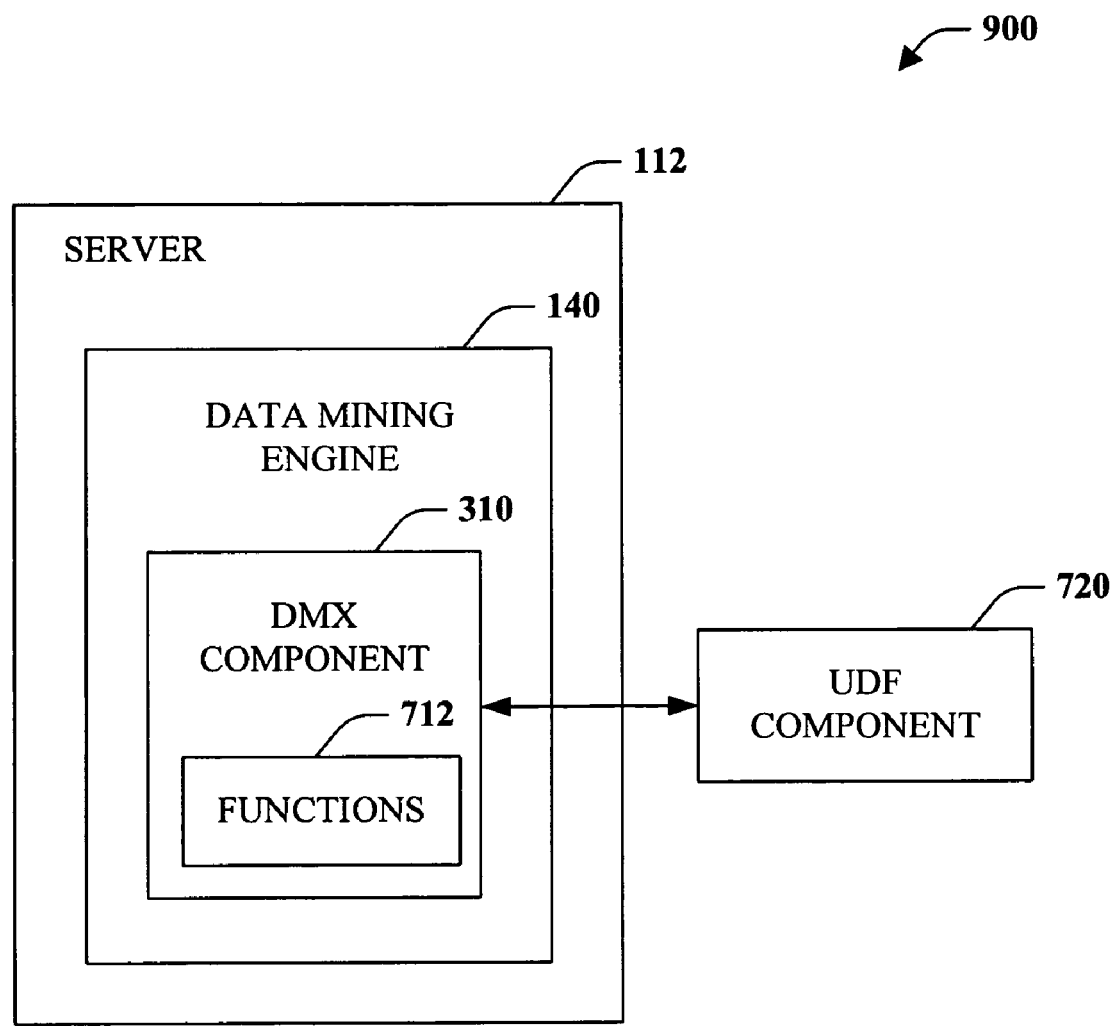
FIG. 9 is a block diagram of an extensible data mining system.

FIG. 9 illustrates a data mining extension system 900 where the data mining language is extended to support UDFs. System 900 includes a server 112 that facilitates analysis of data. As previously described, server 112 can be a component as defined herein and therefore can comprise hardware, software or a combination thereof. Server 112 can include a data-mining engine 140. Data mining engine 140 provides a mechanism to mine data, discover patterns and/or rules with respect to stored data, and utilize those patterns and/or rules to, among other things, predict or categorize new data. Data mining engine 140 can include a DMX (Data Mining extensions) component. DMX component 310 is a data mining language. More particularly, DMX provides extensions to SQL (Structured Query Language) to enable interaction with data mining objects. Accordingly, DMX can facilitate specification and execution by the data mining engine 140 (or a sub component thereof) of one or more commands or queries for manipulating a mining object such as a data mining model (DMM). DMX component 310 can also include one or more built-in or native functions 712. System 900 also includes a user-defined function component 720 that can be employed by DMX component 310.

Once a UDF is received and registered, it can be used in a data mining language for prediction, among other things. In the DMX specification, the typical prediction syntax is defined generically as follows:

```
SELECT <select-list>
FROM <model> [NATURAL] PREDICTION JOIN
<source data query> AS <alias>
[ON <on_list>] [WHERE <where_clause>]
```

An expression in <select-list> and <where_clause> can include any built-in prediction function 712. Examples of built-in functions 712 are Predict( ), PredictProbability( ), PredictHistogram( ), ClusterProbability( ) among others. System 900 enables the expression in <select-list> and <where_clause> to include any user-defined function 720. The following is an example utilizing the UDFSampleClass described supra with respect to creation and registration:

```
SELECT
DMSproc.UDFSample.UDFSampleClass.GetTypeString(myModel.CreditType)
FROM myModel PREDICTION JOIN (SELECT 'Programmer' AS Occupation,
50000 AS Income) AS t
ON t.Occupation = myModel.Occupation AND t.Income = myModel.Income
```

A UDF component 720 can return any data type including scalar and table. A table return value can be a set of tuples with multiple columns.

Furthermore, in many cases evaluation of a data-mining query comprises two internal phases: prepare and execute. At preparation phase, the data-mining engine 140 determines the return type of the UDF. To achieve this, the UDF component 720 may be invoked with some indicator that will identify if the invocation is for prepare or execute. If the UDF component 720 is invoked for prepare, the UDF has to return a value of its return type from which all schema information can be derived. This should include all columns information if the return type is table.

It should also be appreciated that the UDF component 720 (FIG. 7) provided to and received by the data mining server can be a user defined system stored procedure to perform, amongst other things, administrative tasks. The data mining language component 710 can thus be extended to support calls to or invocation of user defined system stored procedures.

The aforementioned systems and have been described with respect to the interaction between several components. It should be appreciated that such systems and components can include those components or sub-components specified therein, some of the specified components or sub-components, and/or additional components. Some of components specified as sub-components could also be implemented as components communicatively coupled to other components. Additionally, it should be noted that one or more components may be combined into a single component providing aggregate functionality or divided into several sub-components. For example, in systems 100 and 500 of FIGS. 1 and 5, respectively, a receiver component is provided that also provides registration functionality. This functionality could be divided out into a separate registration component for example as shown with respect to system 800 of FIG. 8. The components may also interact with one or more other components not specifically described herein but known by those of skill in the art.

Furthermore, as will be appreciated that various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

Figure 10:
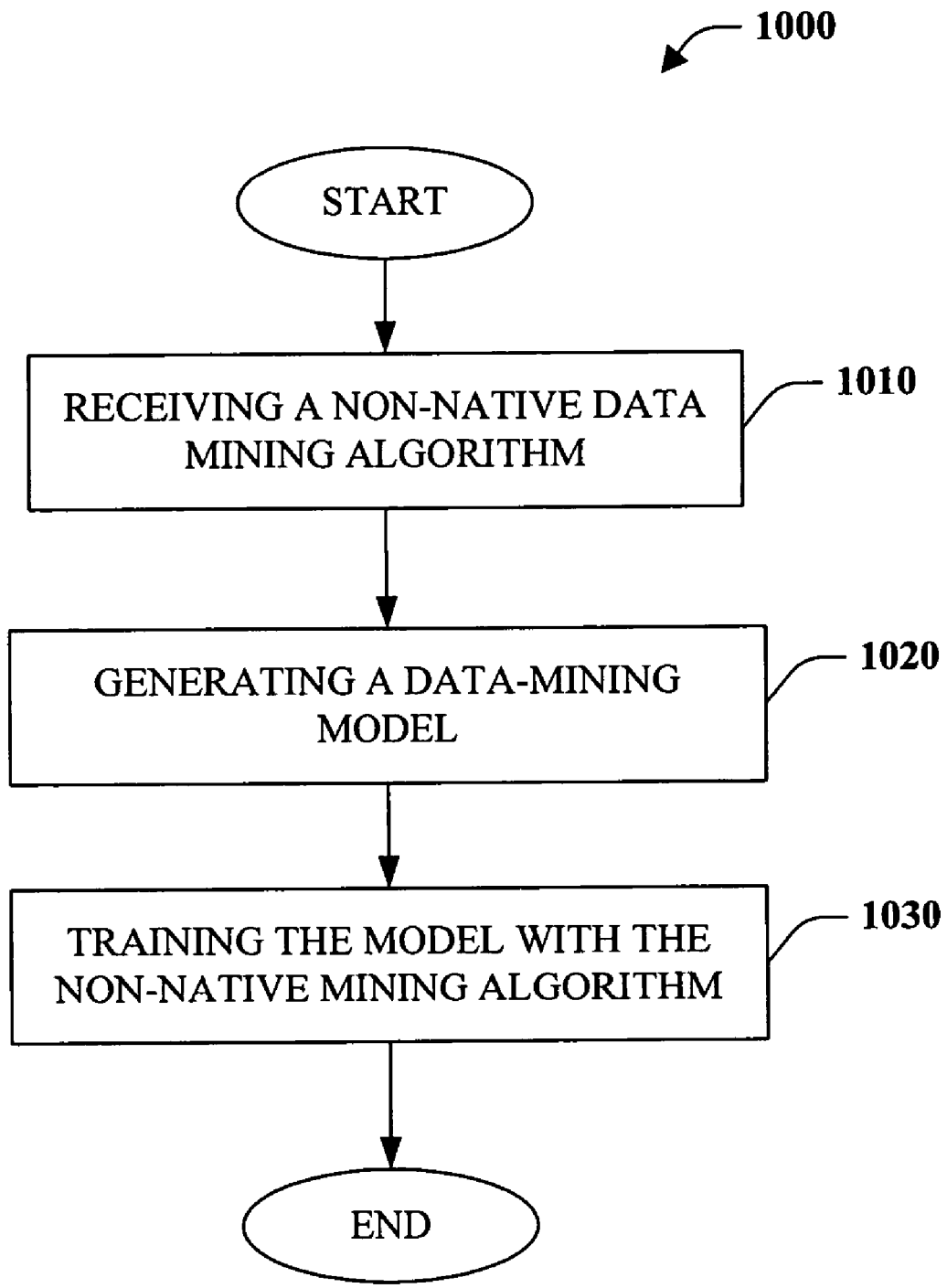
FIG. 10 is a flow chart diagram of a data mining server methodology that receives and supports non-native data mining algorithms.
Figure 11:
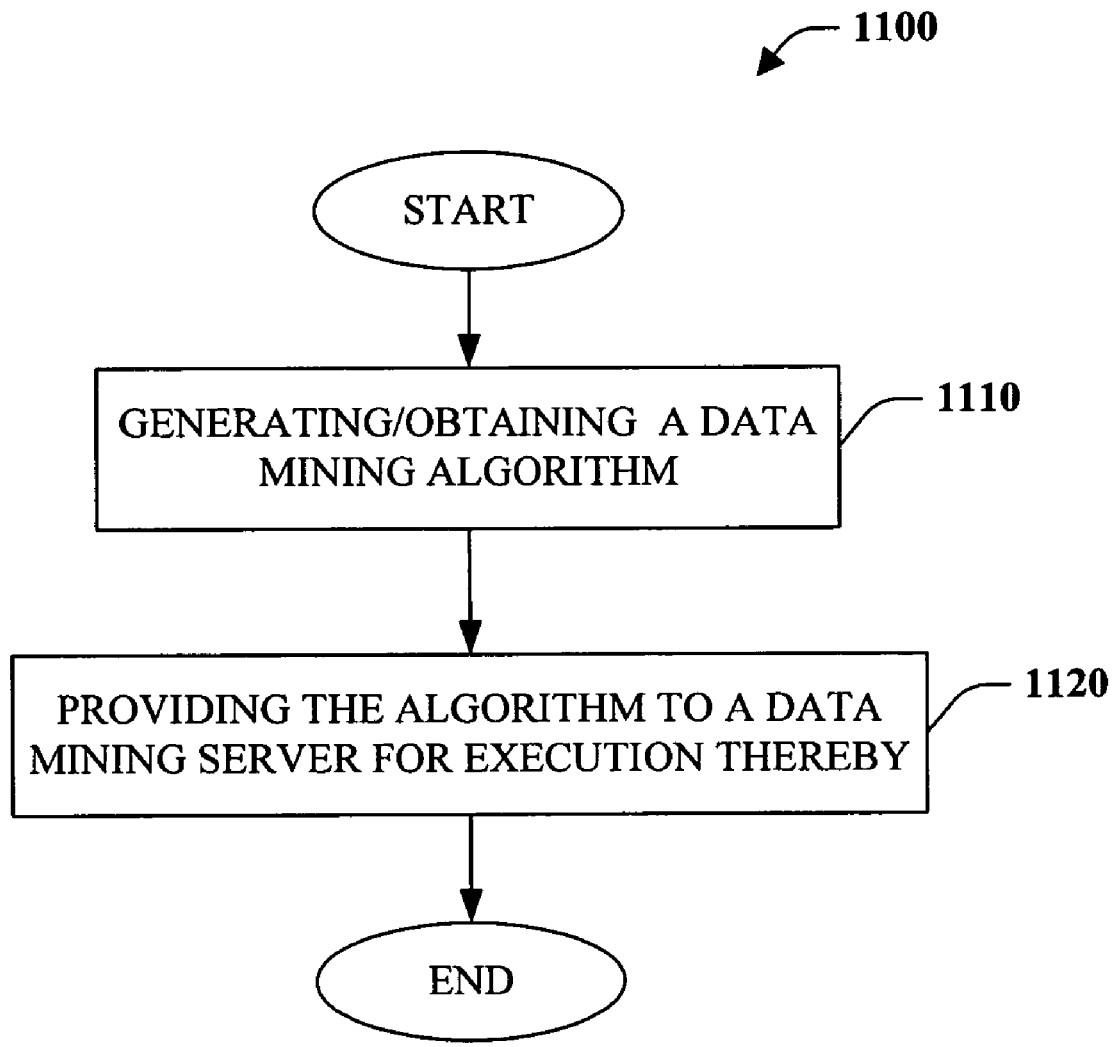
FIG. 11 is a flow chart diagram of a data mining methodology for employing a non-native data-mining algorithm.
Figure 12:
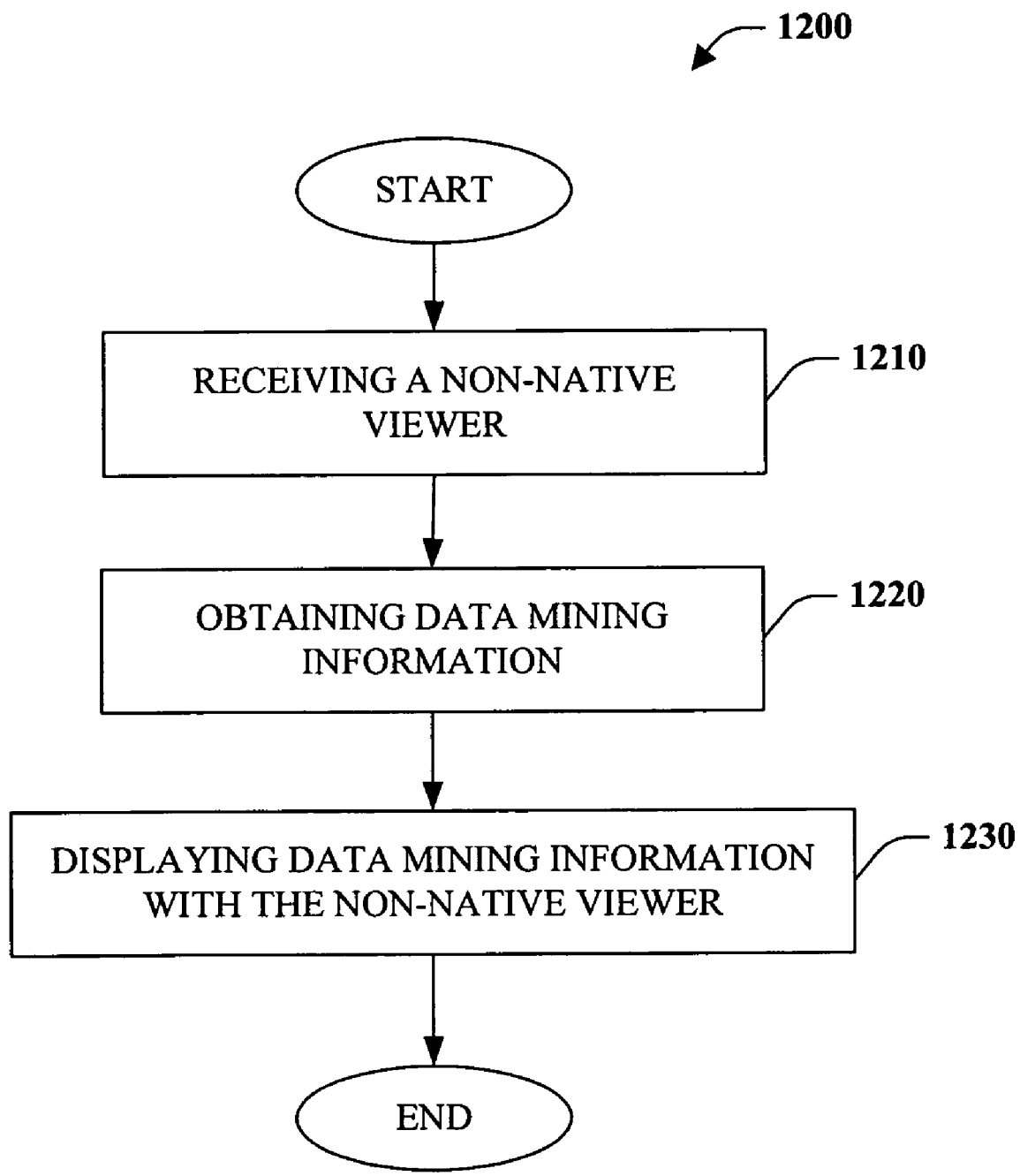
FIG. 12 is a flow chart diagram of a data mining methodology for employing non-native viewers in exploring patterns discovered by a data-mining engine.

In view of the exemplary systems described supra, methodologies that may be implemented in accordance with the disclosed subject matter will be better appreciated with reference to the flow charts of FIGS. 10-12. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

Turning to FIG. 10, a data mining server methodology 1000 is illustrated. At reference numeral 1010, a non-native data-mining algorithm is received. A non-native data-mining algorithm is one that is not built-in to a data mining server system. Such algorithms may be created by researchers or niche venders, among others. The non-native algorithm may be registered and/or stored upon receipt. Once introduced or plugged into a data mining server or like system the non-native algorithms are fully integrated such that they can be employed and operate at the same level as built-in algorithms. Thus, they can employ and enjoy all the services and mechanisms provided by a server. This frees developers of non-native algorithms from having to implement data handling, parsing, metadata management, session, and row set code, inter alia, on top of the core data mining algorithm implementation. At 1020, a data-mining model is generated. At reference numeral 1030, the data-mining model can be trained or populated utilizing the non-native data-mining algorithm.

FIG. 11 depicts a data mining methodology 1100 for employment of a non-native data-mining algorithm. At reference numeral 1010, a data-mining algorithm is generated, obtained or otherwise identified. At 1120, the algorithm is provided to a data-mining server for use or execution thereby. A new data-mining algorithm may be generated to satisfy a need not satisfied by built-in data mining algorithms. For example, a data mining algorithm may be implemented with a new analysis technique not otherwise provided by the server (e.g., decision trees, naïve Bayesian, clustering, sequence clustering, association rules, neural network, time series, support vector machines decision forest, classification, categorization summary statistics, . . . ). Additionally or alternatively, a new algorithm may be generated that is more accurate or targeted toward a particular problem space. The algorithm can then be provided or plugged-into a data mining server platform to enable execution and utilization of other model development tools, services, or facilities (e.g., wizards . . . ), viewers or GUIs, interfaces, application development environment, security, transaction handling, persistence and retrieval support and more.

Turning to FIG. 12, a data mining method 1200 is provided to support exploration of data mining information via non-native or plug-in viewers. At reference numeral 1210, a non-native viewer or graphical user interface is received. Upon receipt, the viewer may be persisted and/or registered thereby making it available for use. Once the non-native viewer as been received stored and/or registered, the viewer can be fully integrated within a data mining system or tool such that it operates or is interacted with in a manner no different from the built-in viewers. To enable such full integration, the non-native data viewer may implement one or more interfaces or application programming interfaces that can be consumed or called by the data mining system. At 1220, data mining data or information can be obtained, for instance from a data mining server. The data mining information can pertain to patterns discovered by a data-mining engine and/or server. At 1230, the data mining data or information can be displayed with the non-native viewer. For instance, the contents of a data-mining model can be displayed to facilitated analysis by a user. It should be appreciated that the non-native viewer can display a mining model associated with or trained by a built-in algorithm. Alternatively, the non-native viewer can display a mining model trained by a non-native or plugged in data-mining algorithm.

Figure 13:
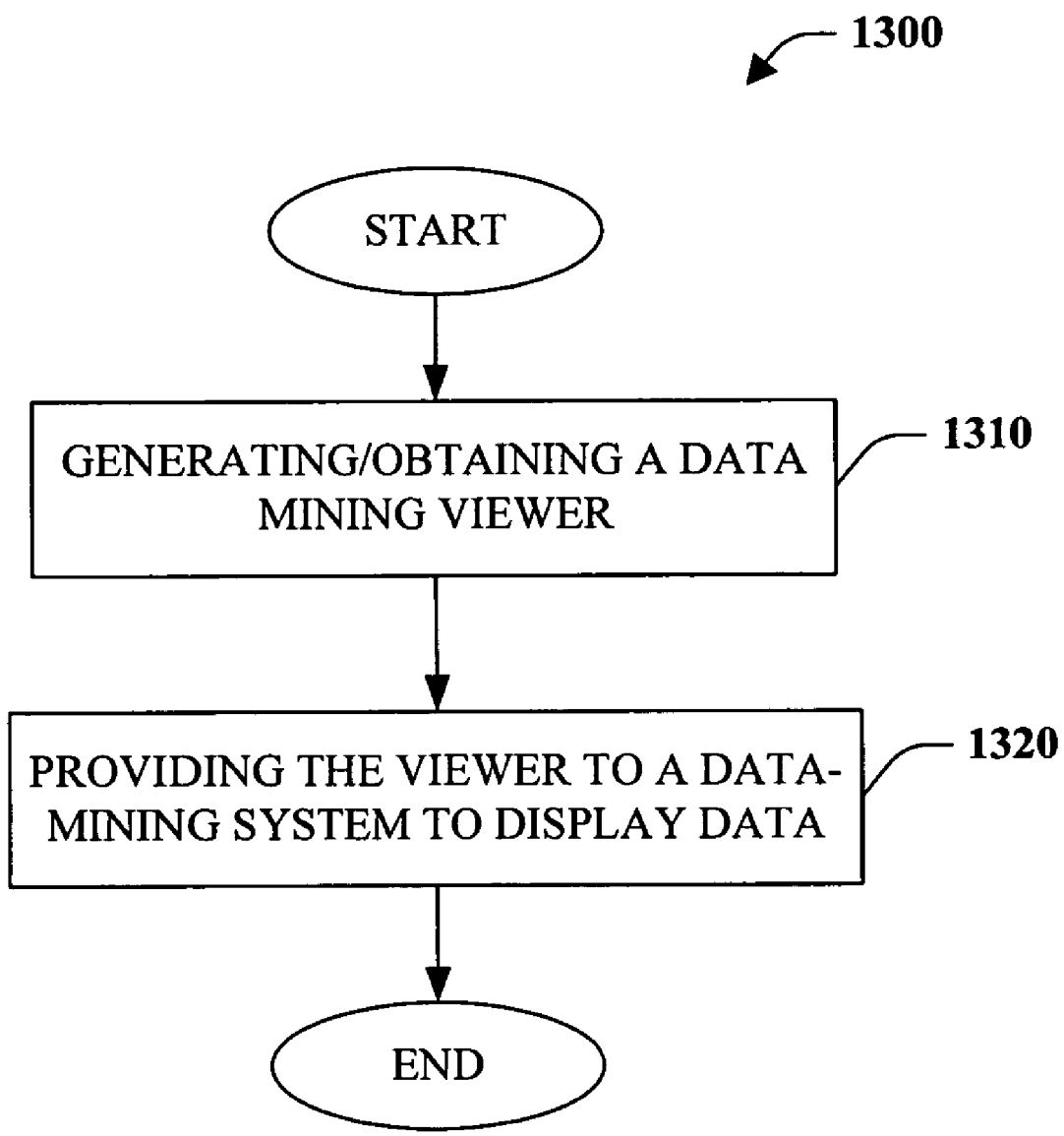
FIG. 13 is a flow chart diagram of a data mining methodology for employing viewers to explore patterns discovered by a data-mining engine.

FIG. 13 is a flow chart diagram depicting a data mining methodology 1300 for exploring data mining data or information. At reference numeral 1310, a data-mining viewer is generated, obtained or otherwise identified. At 1320, the viewer is provided to a data-mining system including but not limited to a client tool to enable display of data-mining data therewith. For example, data-mining model content or patterns can be displayed to a user to enable human analysis. The viewer can be provided to display mining model content provided by one or both of native or built-in and non-native or plug-in data mining algorithms.

Figure 14:
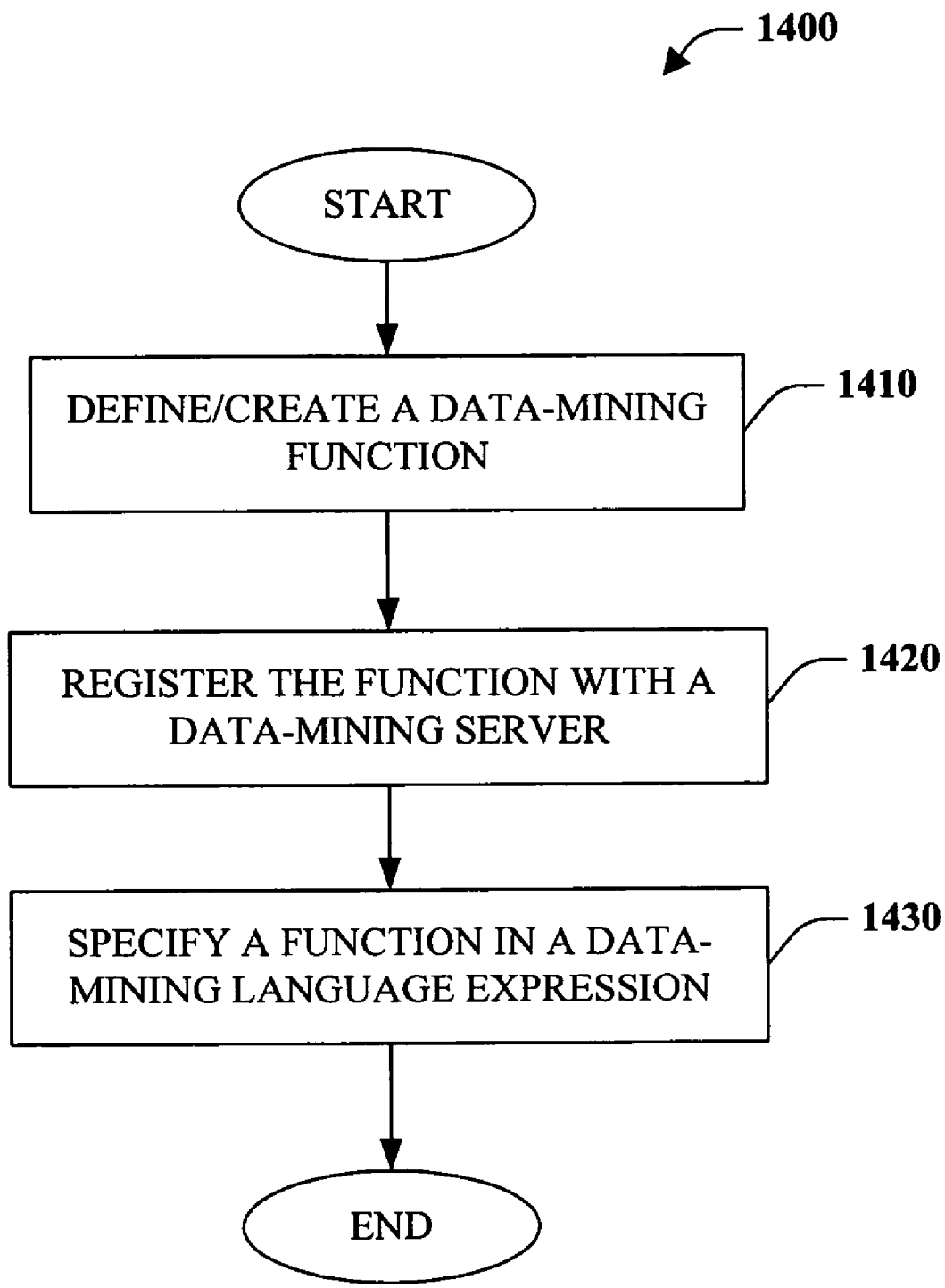
FIG. 14 is a flow chart diagram of a data mining extension methodology.

Turning to FIG. 14, a data mining extension methodology is provided. At reference numeral 1410, a data mining function is defined or created by a user or at the direction of a user. For example, specialized prediction functions may be defined. At 1420, the function is provided to and registered with a data mining server system. Subsequently the function is available for use. At reference numeral 1430, a function is specified in conjunction with a data mining language or data mining language expression. Subsequently, a server or other environment can execute the user-defined data mining function. Extending a data mining language to support a user defined function allows users to perform customized functionality within the same language of the framework, data mining, thereby maximizing the reusability and performance of the UDF.

Figure 15:
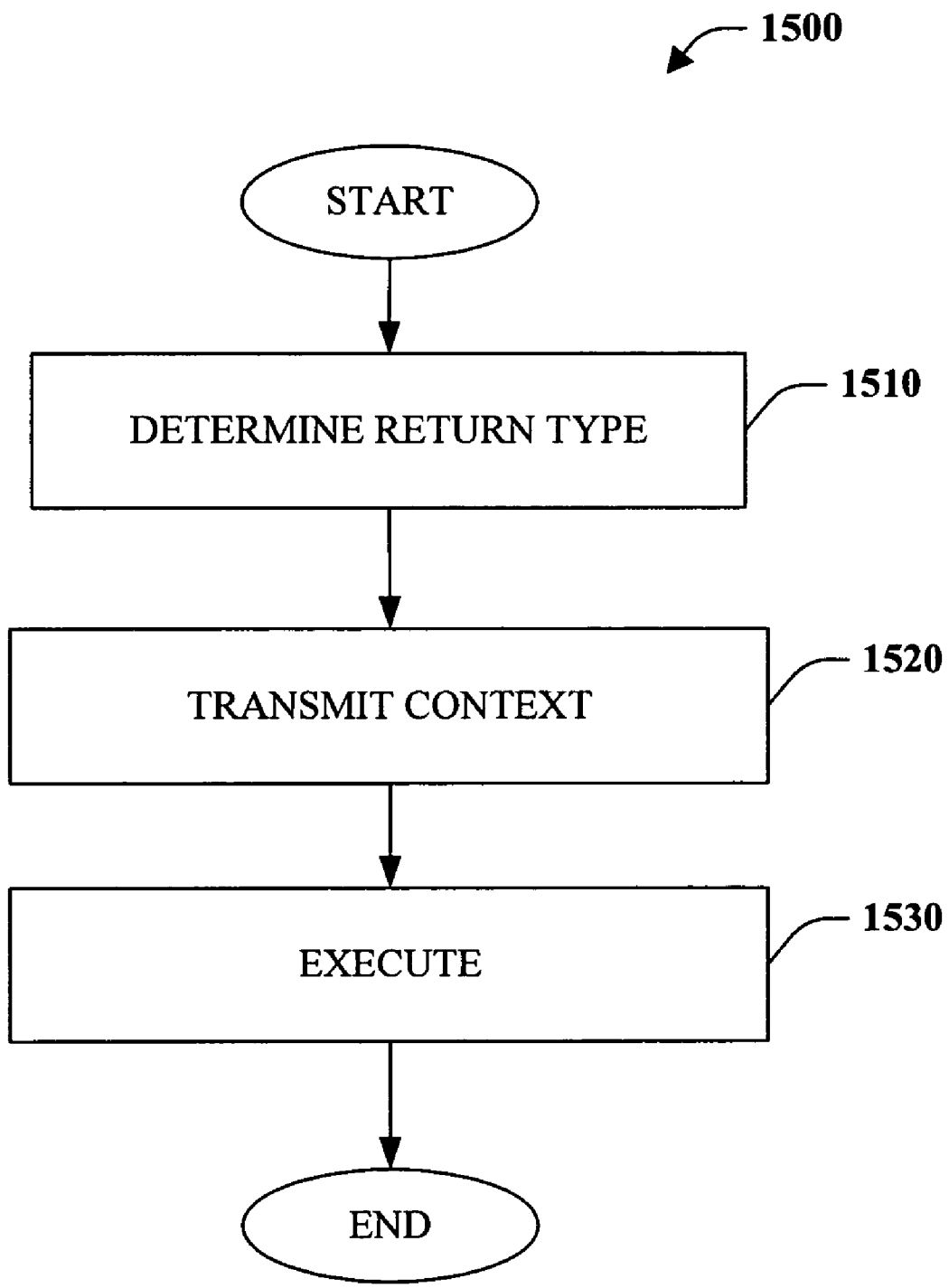
FIG. 15 is a flow chart diagram of user defined function methodology.

FIG. 15 is a flow chart diagram of a user defined function methodology 1500. Evaluation of a data-mining query can include two internal phases: prepare and execute. At reference numeral 1510, a data-mining engine or other execution component prepares for execution by determining the return type of the user-defined function. To achieve this, the UDF may be invoked with some indicator that will identify if the invocation is for prepare or execution. If the UDF is invoked for prepare, the UDF returns a value of its return type from which all schema information can be derived. This could include all columns information if the return type is a table. At 1520, context is transmitted to the user defined function. Context can include but is not limited to information regarding the database or data mining model being employed, prediction input cases, and other server context such as session memory allocators, collation, and the like. The context can be passed to a UDF at the time when it is invoked. The UDF can receive the context through either a predefined variable or a parameter, for instance. The parameters of a UDF can be any expression including a column reference that binds to either the data-mining model being used or prediction input. An object model may also be provided to the UDF to enable it to access the mining model, column and prediction input from column references. At 1530, the user defined function is executed.

Figure 16:
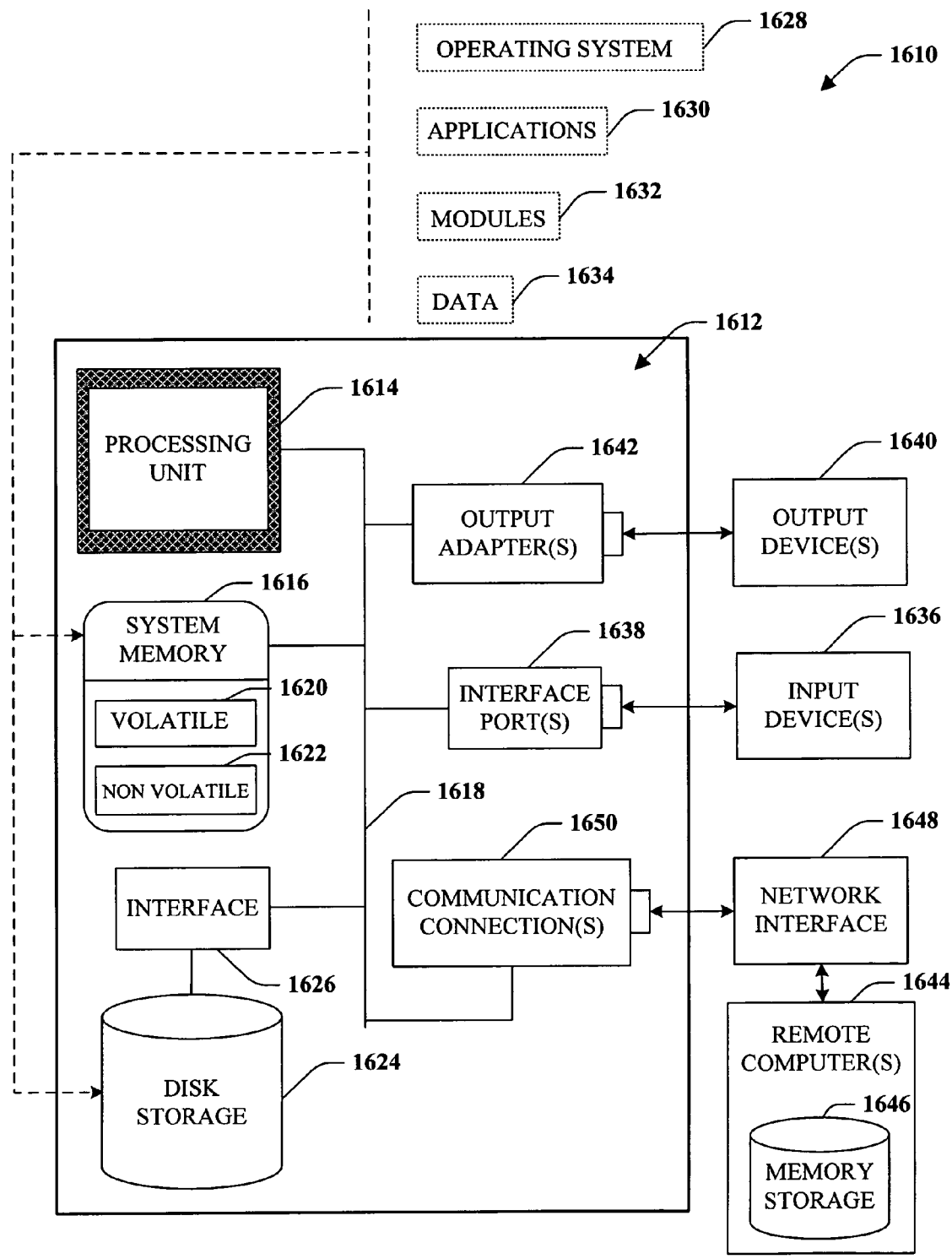
FIG. 16 is a schematic block diagram illustrating a suitable operating environment.
Figure 17:
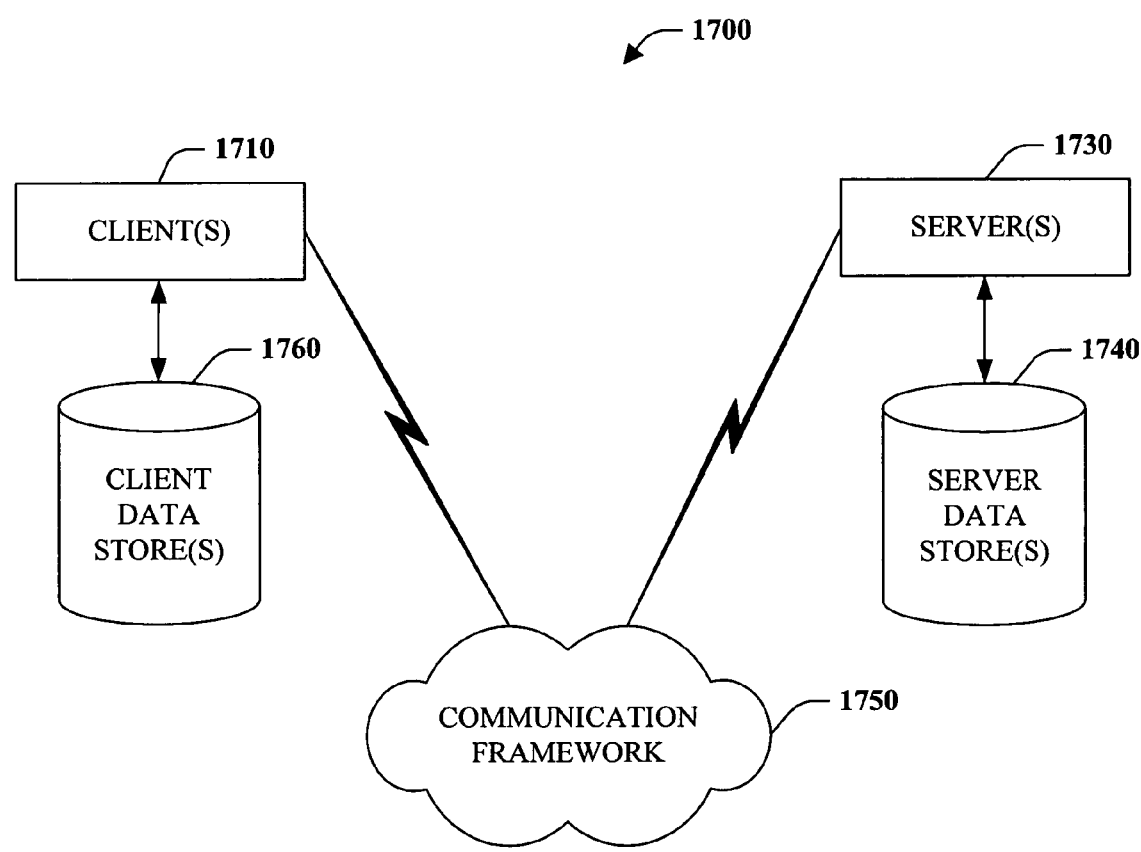
FIG. 17 is a schematic block diagram of a sample-computing environment.

In order to provide a context for the various aspects of the disclosed subject matter, FIGS. 16 and 17 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the claimed subject matter also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 16, an exemplary environment 1610 for implementing various aspects disclosed herein includes a computer 1612 (e.g., desktop, laptop, server, hand held, programmable consumer or industrial electronics . . . ). The computer 1612 includes a processing unit 1614, a system memory 1616, and a system bus 1618. The system bus 1618 couples system components including, but not limited to, the system memory 1616 to the processing unit 1614. The processing unit 1614 can be any of various available microprocessors. Dual microprocessors and other multiprocessor architectures also can be employed as the processing unit 1614.

The system bus 1618 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable ROM (EEPROM), or flash memory. Volatile memory 1620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1612 also includes removable/non-removable, volatile/non-volatile computer storage media. FIG. 16 illustrates, for example, disk storage 1624. Disk storage 1624 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1624 to the system bus 1618, a removable or non-removable interface is typically used such as interface 1626.

It is to be appreciated that FIG. 16 describes software that acts as an intermediary between users and the basic computer resources described in suitable operating environment 1610. Such software includes an operating system 1628. Operating system 1628, which can be stored on disk storage 1624, acts to control and allocate resources of the computer system 1612. System applications 1630 take advantage of the management of resources by operating system 1628 through program modules 1632 and program data 1634 stored either in system memory 1616 or on disk storage 1624. It is to be appreciated that the present invention can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612 and to output information from computer 1612 to an output device 1640. Output adapter 1642 is provided to illustrate that there are some output devices 1640 like displays (e.g., flat panel and CRT), speakers, and printers, among other output devices 1640 that require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1650 refers to the hardware/software employed to connect the network interface 1648 to the bus 1618. While communication connection 1650 is shown for illustrative clarity inside computer 1612, it can also be external to computer 1612. The hardware/software necessary for connection to the network interface 1648 includes, for exemplary purposes only, internal and external technologies such as, modems including regular telephone grade modems, cable modems, power modems and DSL modems, ISDN adapters, and Ethernet cards or components.

FIG. 17 is a schematic block diagram of a sample-computing environment 1700 with which the present invention can interact. The system 1700 includes one or more client(s) 1710. The client(s) 1710 can be hardware and/or software (e.g., threads, processes, computing devices). The system 1700 also includes one or more server(s) 1730. Thus, system 1700 can correspond to a two-tier client server model or a multi-tier model (e.g., client, middle tier server, data server), amongst other models. The server(s) 1730 can also be hardware and/or software (e.g., threads, processes, computing devices). The servers 1730 can house threads to perform transformations by employing the present invention, for example. One possible communication between a client 1710 and a server 1730 may be in the form of a data packet adapted to be transmitted between two or more computer processes. The system 1700 includes a communication framework 1750 that can be employed to facilitate communications between the client(s) 1710 and the server(s) 1730. The client(s) 1710 are operatively connected to one or more client data store(s) 1760 that can be employed to store information local to the client(s) 1710. Similarly, the server(s) 1130 are operably connected to one or more server data store(s) 1740 that can be employed to store information local to the servers 1730.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A computer implemented extensible data mining system comprising:
   a receiver component that obtains and stores a data mining extensions (DMX) non-native data mining model creator component; and
   a configuration component to receive a request to initialize configuration of the DMX data mining engine or a server associated therewith;
   a data mining engine that employs the non native DMX data mining engine model creator to generate a data-mining model;
   a registration component that uses XMLA (Extensible Markup Language for Analysis) to register the model;
   a prepare and execute process for determining the return type of the model and utilizing the data mining model; and
   a computer readable medium for the DMX data mining engine where the learned content generated by the mining model creator is stored and retrieved for use.

2. The system of claim 1, the data-mining engine implements one or more interface components that enables the DMX mining engine model creator to interact with the engine and/or services or facilitates provided thereby.

3. The system of claim 2, the model creator component includes one or more interface components to enable the DMX engine to interact with the DMX mining model creator.

4. The system of claim 3, one interface component creates a DMX model creator that is instance bound to a specific mining model.

5. The system of claim 3, one interface component provides DMX model creator capability information to the data-mining engine including one or more of DMX model creator type, name, parameters, validation, description, viewer type, and prediction functions.

6. The system of claim 3, one interface component provides the DMX data-mining engine with access to one or more functions of a model instance including one or more of training, prediction, and browsing.

7. The system of claim 3, one interface component receives cases for training from the mining engine.

8. The system of claim 3, one interface component exposes a trained DMX mining model to the DMX engine.

9. The system of claim 1, further comprising a non-native viewer component that interacts with the engine to facilitate graphical display of DMX mining model content generated by a DMX mining model creator.

10. The system of claim 9, where the viewer component displays content generated by a non-native DMX mining model creator.

11. A data mining extension methodology comprising:
defining a Data Mining Extensions (DMX) data-mining model;
registering the DMX model with a data-mining server through the use of XMLA (Extensible Markup Language for Analysis) to enable the DMX model to be recognized by a data mining language;
initializing the configuration of the DMX data mining engine or a server associated therewith;
executing data mining operations employing the DMX data mining model through a prepare and execute process for determining the return type of the model and utilizing the data mining model; and
retrieving the result from storage and utilizing it.

12. The method of claim 11, where the DMX data mining model is user defined utilizing XMLA.

13. The method of claim 12, specifying a user-defined model in a DMX data mining language expression utilizing XMLA.

14. A data mining server method comprising:
receiving a Data Mining Extensions (DMX) non-native data-mining model creator on a server through the use of XMLA (Extensible Markup Language for Analysis) to register the model;
generating a DMX data mining model;
registering the DMX model with a data-mining server through the use of XMLA (Extensible Markup Language for Analysis) to enable the DMX model to be recognized by a data mining language;
initializing the configuration of the DMX data mining engine or a server associated therewith;
applying the DMX mining model creator to historical data to generate the model; and
invoking the model to produce a result through a prepare and execute process for determining the return type of the model and utilizing the data mining model.

15. The method of claim 14, further comprising applying the DMX data model to a new set of data to generate predictions.

16. The method of claim 14, further comprising displaying the contents of the DMX model with a built-in viewer.

17. The method of claim 14, further comprising receiving a non-native viewer.

18. The method of claim 17, further comprising displaying the contents of the DMX model with the non-native viewer.

19. The method of claim 17, further comprising displaying the contents of a DMX model trained by a built-in DMX model creator with the non-native viewer.

* * * * *